Nov. 5, 1963     H. LUDWIG     3,109,200
APPARATUS FOR PRODUCING INJECTION MOLDED PLASTIC ARTICLES
Filed Feb. 15, 1962     3 Sheets-Sheet 1
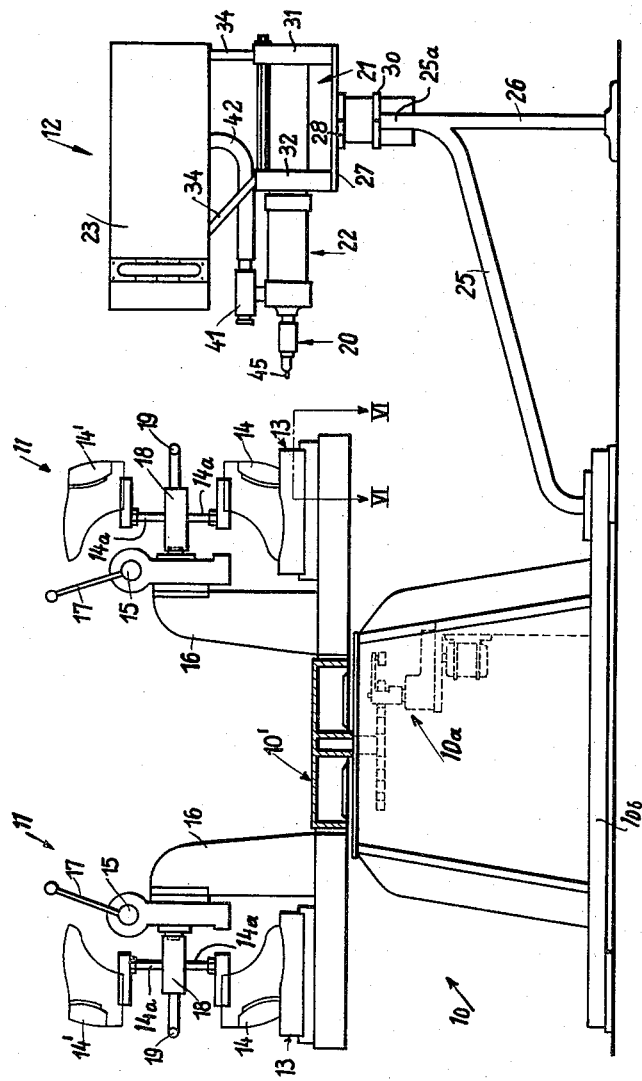
Inventor:
Herbert Ludwig
by:
Michael S. Striker
Attorney Nov. 5, 1963    H. LUDWIG    3,109,200
APPARATUS FOR PRODUCING INJECTION MOLDED PLASTIC ARTICLES
Filed Feb. 15, 1962    3 Sheets-Sheet 2
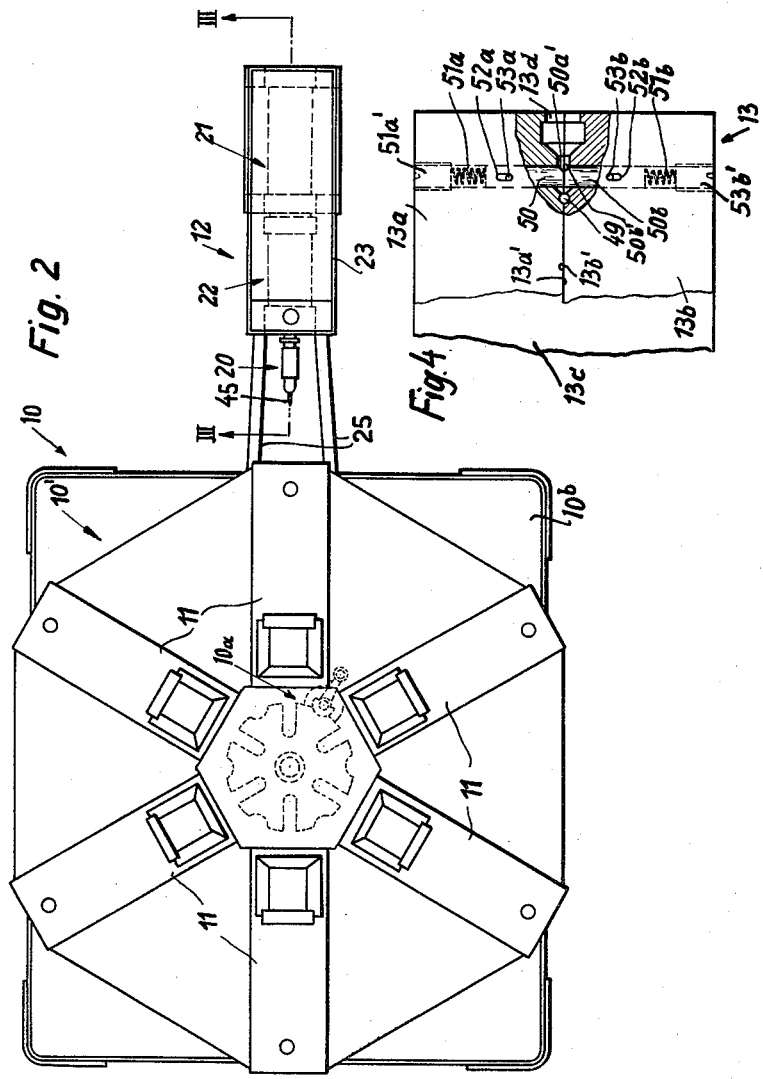
Inventor:
Herbert Ludwig
by:
Richard S. Striker

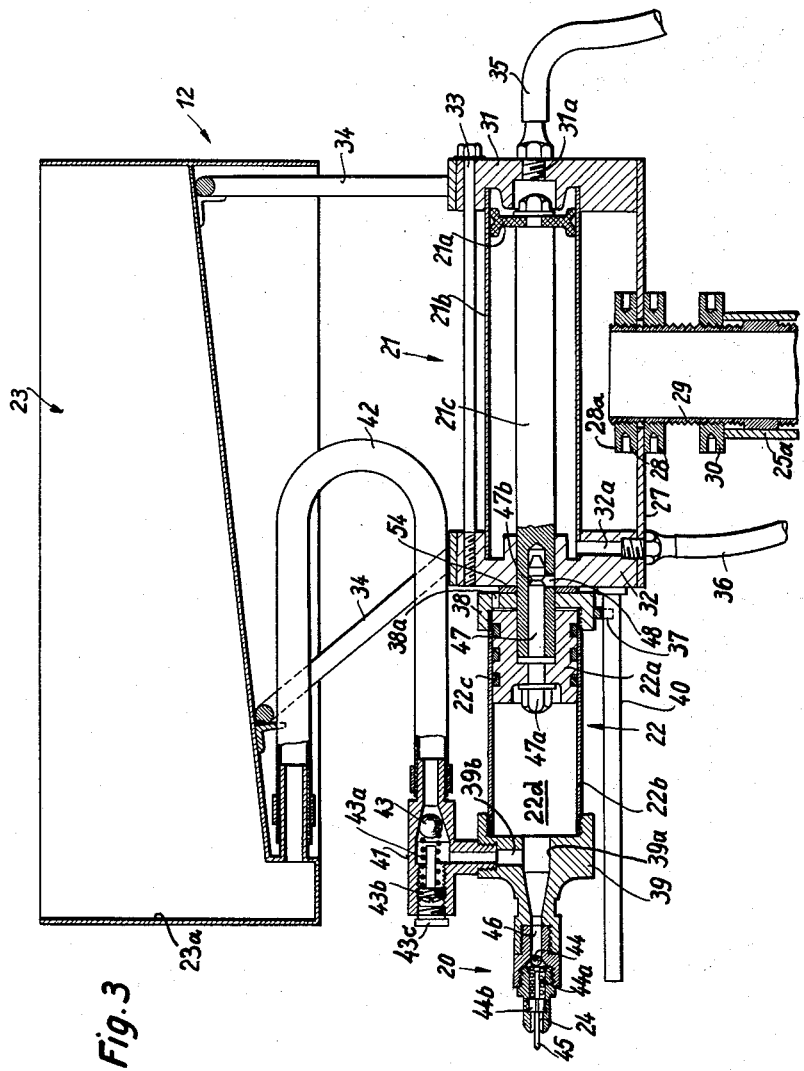

United States Patent Office 3,109,200
Patented Nov. 5, 1963

3,109,200
APPARATUS FOR PRODUCING INJECTION
MOLDED PLASTIC ARTICLES
Herbert Ludwig, Desmastrasse 112, Uesen,
near Bremen, Germany
Filed Feb. 15, 1962, Ser. No. 173,481
Claims priority, application Germany Oct. 5, 1961
8 Claims. (Cl. 18—30)

The present invention relates to an apparatus for the production of injection molded plastic articles, particularly to an apparatus for the production of plastic soles for articles of footwear. Still more particularly, the invention relates to an apparatus which may be utilized for molding and for simultaneously securing plastic soles to the uppers of articles of footwear in a mass-manufacturing operation.

In known injection molding apparatus of which I am aware at this time, plastic material is admitted to the extruder head at elevated pressures, and the material is prevented from escaping through the channel of the extruder head by needle which permits outflow of material when the extruder head engages the mold. Such types of injection molding apparatus utilize compressed air to maintain the plastic material at elevated pressures, and it can be observed again and again that air will bubble through the nozzle of the extruder head to enter into the mold cavity so that the resulting product is of inferior quality. In addition, compressed air may contain some moisture which is entrained with the plastic material to bring about surface roughness and other defects in the ultimate product. The deposition of moisture is particularly undesirable if the plastic material is polyvinyl chloride or a similar synthetic plastic substance. Furthermore, the plastic material must be stored in strong and hence costly tanks which consist of high-quality material and which must be checked with great care to avoid utilization of unsatisfactory materials because they must withstand substantial pressures so that the higher cost of the tank or tanks adds to the overall cost of the apparatus.

Accordingly, it is an important object of the present invention to provide an injection molding apparatus whose injecting machine may be constructed and assembled in such a way that the material receiving compartment of the plastic containing tank may be maintained at atmospheric pressure and that plastic material may be admitted to the extruder head at normal rather than elevated pressures.

Another object of the invention is to provide an apparatus of the just outlined characteristics wherein the injecting machine which delivers plastic material into one or more molds may be equipped with a lightweight, simple and inexpensive source of plastic material.

A further object of the invention is to provide an apparatus which is especially suited for mass-manufacture of plastic soles and for simultaneous application of plastic soles to the uppers of articles of footwear and wherein the plastic material is subjected to elevated pressures only during actual injection into the mold cavity.

An additional object of the invention is to provide an improved injecting machine for use in an apparatus of the above described character wherein the means which draws plastic material from the tank simultaneously controls movements of the extruder head toward and away from the mold.

A concomitant object of the invention is to provide an apparatus for injection molding of plastic articles whose mold or molds are constructed in such a way that any outflow of plastic material from the mold cavity is automatically prevented as soon as the extruder head is separated from the mold.

Still another object of the invention is to provide an apparatus of the above outlined characteristics wherein the extruder head may be rapidly and conveniently aligned with the sprue opening of the mold.

A further object of the invention is to provide an injecting machine which can be readily dismantled and cleaned if it is to be utilized for injection of differently colored plastic materials or if the operator desires to utilize a plastic material of different composition.

With the above objects in view, the invention resides in the provision of an apparatus which comprises one or more molds having mold cavities adapted to receive predetermined quantities of plastic material, and an injecting machine which delivers plastic material to the mold cavity or cavities. This injecting machine comprises a source of plastic material in the form of an open-top tank or the like, a cylinder which carries the extruder head and whose piston defines with one end portion of the cylinder a variable-volume chamber which communicates with the channel of the extruder head and with the plastic source, and means for reciprocating the piston in the cylinder so as to vary the volume of the chamber and for reciprocating the cylinder with the extruder head toward and away from the mold. When the extruder head engages with the mold and the piston is moved in a direction to reduce the volume of the chamber, the material is injected at elevated pressure through the extruder head and into the mold cavity. On the other hand, when the piston is moved in the opposite direction, the volume of the chamber increases so that plastic material is automatically sucked into this chamber and may flow into the extruder head without being subjected to elevated pressures.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIG. 1 is a schematic side elevational view of an apparatus for producing injection molded synthetic plastic articles which embodies my invention, certain parts of the rotary mold assemblies being broken away;

FIG. 2 is a schematic top plan view of the apparatus, with certain component parts of the mold assemblies omitted for the sake of clarity;

FIG. 3 is a somewhat schematic central longitudinal section through the material injecting machine which forms part of the apparatus shown in FIGS. 1 and 2, the section of FIG. 3 being taken along the line III—III of FIG. 2; and FIG. 4 is a greatly enlarged fragmentary horizontal section taken along the line IV—IV of FIG. 1, showing a portion of a mold and the arrangement which prevents outflow of injected plastic material upon withdrawal of the injection nozzle.

Referring now in greater detail to the drawings, and first to FIGS 1 and 2, there is shown an injection molding apparatus which comprises a mold supporting means 10 including a turntable 10' which is rotatable about a vertical axis and is intermittently driven by a Geneva gear or another suitable transmission 10a. The turntable 10' supports several equidistant substantially radially arranged mold assemblies 11, e.g. six in number, and each of these mold assemblies includes a composite sole mold 13 one of which will be described in greater detail with reference to FIG. 4.

The injection molding apparatus of FIGS. 1 and 2 further comprises an injecting machine 12 which consecutively introduces plastic material into the cavities of the molds 13 forming part of the mold assemblies 11 when the turntable 10' is intermittently driven by its transmission 10a. The exact construction of the transmission 10a forms no part of my invention. For example, this transmission may be operatively connected with an adjustable clockwork or timer mechanism in order to intermittently rotate the turntable 10' and to consectively advance the molds 13 into proper alignment with the injection nozzle 24 which is connected to or forms part of the extruder head 20 in the machine 12. It is assumed that the apparatus of FIGS. 1 and 2 is utilized for molding plastic soles onto articles of footwear and, in such instances, the turntable may be driven at intervals of between 0 and 120 seconds and the length of intervals may be varied infinitely, if desired. Thus, if the turntable is driven at intervals of say 30 seconds, the operator can mold a plastic sole onto a specific article of footwear within the same period of time. Each mold assembly 11 further comprises a pair of lasts 14, 14' turnably supported by a bracket 16 which is mounted on the turntable 10'. As shown in FIG. 1, each pair of lasts 14, 14' is respectively carried by two arms 14a, 14a' which are secured to a spindle 18 provided with a hand-actuated lever 19, and this spindle may be lifted or lowered within certain limits by an eccentric 15 which is mounted on the bracket 16 and is actuatable by a lever 17. By turning the lever 19 and the spindle 18 through 180 degrees, the operator may alternately move the lasts 14, 14' of a selected mold assembly 11 into position for engagement with the edge plates of the respective mold 13 in response to actuation of the lever 17. The last 14 or 14' may seal the open top of the mold cavity in the respective mold 13 and supports the upper of an article of footwear during the molding operation.

In addition to the aforementioned extruder head 20, the injecting machine 12 comprises a reciprocating assembly 21 which includes an elongated double-acting fluid-operated cylinder 21b and a piston 21a which is reciprocable in a horizontal direction so as to advance the extruder head 20 toward or away from that mold 13 which is momentarily aligned with the machine 12. The latter also comprises a source of plastic material in the form of an open-top tank or vessel 23 which is mounted above the reciprocating assembly 21. The extruder head 20 is not directly connected with the reciprocating assembly 21 but is supported by the elongated cylinder 22b of a second piston and cylinder assembly 22 which simultaneously serves as a means for intermittently withdrawing predetermined quantities of plastic material from the tank 23 in rhythm with the operation of the injecting machine 12, as well as to expel plastic material through the channel 46 of the extruder head 20 and into the cavities of the molds 13. The withdrawal of plastic material from the tank 23 occurs by suction and takes place at such intervals that a new supply of plastic material is drawn into the variable-volume chamber 22d of the cylinder 22b whenever the extruder head 20 is withdrawn in a direction away from the momentarily aligned mold assembly 11.

The injecting machine 12 is mounted on a two-legged stand 25 which is connected to the base 10b of the mold supporting means 10 (see FIGS. 1 and 2) and which is propped by an upright brace 26. The arrangement is such that the injecting machine 12 is vertically adjustable with respect to the stand 25 by means of a supporting device 27 which is shown in FIG. 3. The hollow upper end portion 25a of the stand 25 slidably receives an externally threaded sleeve 29 which meshes with a first capstan nut 30 resting on the upper end face of the end portion 25a. A pair of similar capstan nuts 28, 28a meshes with the sleeve 29 at a point above the nut 30 and these nuts 28, 28a receive between themselves the plate-like apertured supporting device 27 which is connected with the end portions or caps 31, 32 of the cylinder 21b forming part of the reciprocating assembly 21. Such mounting of the injecting machine 12 enables an operator to adjust the position of the cylinder 21b with respect to the sleeve 29 as well as to adjust the position of the sleeve with respect to the stand 25. For example, if the operator desires to move the machine 12 to a lower level, he turns the nut 30 with respect to the sleeve 29 so that the sleeve may descend into the interior of the upper end portion 25a. A turning of the nut 30 in the opposite direction will bring about a lifting of the entire injecting machine. The purpose of the nuts 28, 28a is to adjust the vertical position of the cylinder 21b without necessitating an adjustment in the position of the spindle 29 with respect to the stand 25, and also to provide a readily separable connection between the supporting device 27 and the sleeve 29. By manipulating the nuts 28, 28a, 30, the operator may rapidly and accurately align the nozzle 24 of the extruder head with the sprue opening 13d of a selected mold 13.

The piston 21a of the reciprocating assembly 21 is slidable in the cylinder 21b and is connected with one end portion of an elongated piston rod 21c which extends through the left hand cap 32 and into the interior of the cylinder 22b forming part of the second piston and cylinder assembly 22. It will be noted that the caps 31, 32 not only seal the longitudinal ends of the cylinder 21b but that they also serve as a means for properly connecting the cylinder 21b and hence the entire injecting machine 12 to the supporting device 27 and through this device with the stand 25. If desired, additional connecting and stiffening means in the form of one or more bolts 33 may be provided to connect the caps 31, 32 and to thereby insure that these caps cannot change their position with respect to each other. The tank 23 is carried by a set of brackets or rods 34 which are mounted on the caps 31 and 32.

The cylinder 21b is of the double-acting type and is provided with two spaced inlets 31a, 32a disposed at the opposite sides of the piston 21a. The inlet 31a communicates with a supply pipe in the form of a flexible hose 35, and the other inlet 32a communicates with a similar hose 36. These hoses are connected to a suitable source of pressure fluid (not shown) e.g. an air compressor, so as to alternately admit pressure fluid to the opposite sides of the piston 21a in order to reciprocate this piston in the cylinder 21b together with the piston rod 21c. The connection between the inlets 31a, 32a and the source of pressure fluid preferably includes suitable electromagnetic or other types of valves which are not shown in the drawings. As is well known to those acquainted with the art of hydraulic and pneumatic cylinders, the inlet 31a serves as an outlet when pressure fluid is admitted through the inlet 32a, and vice versa.

FIG. 3 shows that the piston rod 21c is slidable in a coaxial bore of the end portion or cap 32, and that its forward or left-hand end portion is coupled with the piston 22a of the assembly 22. The piston 22a is provided with sealing rings 22c which engage the internal surface of the cylinder 22a to prevent bleeding of plastic material which is receivable in the cylinder chamber 22d at the left-hand side of the piston 22a. The detachable connection between the piston 22a and the left-hand end portion of the piston rod 21c comprises a coaxial bolt 47 whose head 47a is received in a suitable recess provided in the left-hand end face of the piston 22a and which is slidably received in a coaxial blind bore formed in the left-hand end portion of the piston rod 21c. The right-hand end portion of the bolt 47 is formed with an annular groove 47b which receives a radial screw 48 threaded into a radial bore of the piston rod 21c for retaining the bolt in the blind bore of the piston rod. The advantage of this detachable connection including the bolt 47 and screw 48 is that the piston 22a may be readily separated from the piston rod 21c if it is desired to introduce a plastic material of different composition or different color into the tank 23 and to clean the assembly 22. As shown in FIG. 3, the material receiving compartment 23a of the tank 23 may be maintained at atmospheric pressure because the material is sucked into the chamber 22d.

The cylinder 22b comprises a pair of spaced end portions or caps 38, 39 the former of which is slidably traversed by the piston rod 21c. This cap 38 is formed with an axially parallel aerating port 38a which admits air to the cylinder chamber at the right-hand side of the piston 22a when the latter is moved in a direction to the left, as viewed in FIG. 3, and the port 38a also permits escape of air from this right-hand chamber when the piston 22a is moved to the position of FIG. 3. As shown, the cylinder 22b is supported solely by the piston rod 21c through the cap 38 and piston 22a. In order to make sure that the cylinder 22b cannot turn about the piston rod 21c, the cap 38 is provided with a downwardly extending forked follower 37 which straddles a horizontal guide rod 40 mounted on and extending to the left from the end portion or cap 32.

The left-hand cap 39 of the cylinder 22b is formed with a coaxial bore 39a which communicates with the coaxial channel 46 of the extruder head 20 and with a radial bore 39b of the cap 39. The bore 39b communicates with a radial bore formed in a hollow connecting member 41 whose radially outwardly extending nipple is screwed into a complementary internally threaded bore of the cap 39. The intake end of the nipple 41 is connected to the discharge end of a flexible conduit 42 whose intake end is connected with the suitably inclined bottom of the tank 23 so as to admit plastic material through the connecting member 41 to the bores 39b, 39a and into the variable volume chamber 22d of the cylinder 22b, as well as to the bore 46 of the extruder head 20.

The connecting member 41 actually constitues a valve housing by accommodating a spring-biased one-way valve in the form of a ball valve 43. This valve is biased by a helical spring 43a, and the bias of this spring may be adjusted by a threaded bolt 43b whose slotted head is normally concealed by a threaded plug 43c which is screwed into the coaxial bore of the member 41. A similar spring-biased one-way ball valve 44 is provided in the channel 46 of the extruder head 20. This valve 44 is biased by a spring 44a whose tension may be adjusted by a so-called star nut 44b, and this star nut 44b permits flow of plastic material into the injection nozzle 24 of the extruder head 20 in which the mold opening-or separator needle 45 is located. This needle is connected with the nut 44b.

FIG. 4 illustrates a portion of a composite mold 13 which comprises two so-called edge plates 13a, 13b and a so-called bottom plate 13c. The abutting side faces 13a', 13b' of the edge plates 13a, 13b are formed with complementary grooves which together form a sprue opening 13d through which the nozzle 24 may inject plastic material into the cavity of the mold 13. The material conveying bore 49 of the mold 13 which permits flow of plastic material into the mold cavity defined by the plates 13a, 13b, 13c is normally sealed from the sprue opening 13d by a pair of radially reciprocable pin-shaped gate members 50a, 50b which are respectively slidable in suitable cutouts formed in the edge plates 13a, 13b. The gate members 50a, 50b are biased toward each other by helical springs 51a, 51b which are mounted in the cutouts provided for these members adjacent to the outer end faces thereof. The tension of the springs 51a, 51b may be adjusted by externally threaded plugs 51a', 51b' which are respectively screwed into the edge plates 13a, 13b. The inner end faces of the gate members 50a, 50b are respectively formed with inclined cam faces 50a', 50b' which may be engaged by the tip of the needle 45 when the nozzle 24 of the extruder head 20 extends into the sprue opening 13d. The gate members 50a, 50b are prevented from rotation by radially extending studs 53a, 53b which are received in elongated guide slots 52a, 52b respectively provided in the edge plates 13a, 13b and communicating with the cutouts in which the respective gate members slide. The studs 53a, 53b also prevent ejection of the members 50a, 50b when the edge plates 13a, 13b are moved apart to permit removal of a molded article from the mold cavity. The opening 13d and the bore 49 together form a composite passage through which plastic material may be forced into the mold cavity of the respective mold 13 and which is normally sealed by the gate members 50a, 50b.

The improved injection molding apparatus operates as follows:

It is assumed that the injecting machine 12 has just completed an operation and that the separating needle 45 of the nozzle 24 is still received between the gate members 50a, 50b of a selected mold 13 so that the channel 46 communicates with the bore 49. The operator then admits pressure fluid through the hose 36 and inlet 32a so as to move the piston 21a in a direction to the right, as viewed in FIG. 3, whereby the piston rod 21c entrains the assembly 22 so that the extruder head 20 and the needle 45 are withdrawn from the sprue opening 13d. At the same moment, the springs 51a, 51b compel the gate members 50a, 50b to seal the bore 49 from the sprue opening 13d so that plastic material previously injected into the mold 13 cannot escape from the mold cavity. The cylinder 22b is free to follow the rightward movement of the piston rod 21c because it is coupled thereto by the bolt 47 and piston 22a. The friction between the rings 22c of the piston 22a and the internal surface of the cylinder 22b is sufficient to entrain the assembly 22 in a direction to the right as soon as pressure fluid is admitted through the hose 36. Upon completion of an injection molding operation, i.e. when the extruder head 20 is received in the sprue opening 13d, the piston 22a is located close to the left-hand end of the cylinder 22b, namely, adjacent to the cap 39. Since the maximum stroke of the piston 21a exceeds the maximum stroke of the piston 22a, the cap 38 is moved into abutment with the cap 32 before the piston 21a assumes the position of FIG. 3. It is preferred to insert a cushioning member in the form of a resilient washer 54 or the like between the caps 32, 38 in order to avoid undesirable shocks when the cap 38 is moved into abutment with the cap 32. Once the piston 21a is advanced to such an extent that the cap 38 abuts against the washer 54, the movement of the cylinder 22b with the piston rod 21c is terminated, and the piston rod begins to slide with respect to this cylinder. Consequently, the piston 22a slides from the left-hand end to the right-hand end of the cylinder 22a to assume the position of FIG. 3, whereby the volume of the left-hand chamber 22d in the cylinder 22a is increased and a predetermined quantity of plastic material is automatically sucked from the tank 23 through the conduit 42, through the connecting member 41 and through the bores 39b, 39a into the interior of the cylinder 22b. The one-way valve 43 permits such inflow of plastic material into the cylinder 22b but prevents any return flow of plastic material into the conduit 42. When the assembly 22 reciprocates with the piston rod 21c, the conduit 42 is flexed so that the tank 23 may remain stationary while the connecting member 41 participates in all movements of the cylinder 22b.

In the position of FIG. 3, the left-hand chamber 22d of the cylinder 22b is filled with plastic material, and the injecting machine 12 is ready for the next operation. The valves 43, 44 are in sealing position. The operator then starts the motor which rotates the turntable 10′ so as to move the mold 13 of the next mold assembly 11 into alignment with the extruder head 20, and thereupon admits pressure fluid through the hose 35 so as to move the piston 21a in a direction to the left and to simultaneously advance the assembly 22 in the same direction in order that the extruder head 20 may penetrate into the sprue opening 13d of the momentarily aligned mold 13. As the piston 21a continues its forward stroke in a direction to the left while the hose 36 permits outflow of pressure through the duct 32a, the piston 22a begins to slide in its cylinder 22b to reduce the volume of the chamber 22d and thereby injects plastic material from the chamber 22d through the channel 46, through the sprue opening 13d and between the spaced gate members 50a, 50b into the bore 49. The gate members 50a, 50b are automatically moved away from each other under the action of the needle 45 which engages the inclined cam faces 50a′, 50b′ and separates the two gate members against the bias of the respective springs 51a, 51b. During such injection of plastic material into the bore 49, the closed one-way valve 43 prevents return flow of plastic material into the conduit 42 while the open valve 44 permits plastic material to penetrate from the channel 46 into the sprue opening 13d and into the bore 49.

It will be noted that the two valves 43, 44 respectively prevent return flow of plastic material into the conduit 42 and into the channel 46. Of course, other types of one-way valves may be utilized instead of valves 43, 44, and it is equally possible to provide one-way valve means at the intake end of the conduit 42 rather than in the connecting member 41.

It will be readily understood that the injection molding apparatus 10, 12 of my invention may be put to many other uses in addition to molding of plastic soles onto articles of footwear or the like. Also, the apparatus may comprise a single mold since the operation of the injecting machine 12 remains unchanged even if the material is always injected into the same mold cavity as long as the injection takes place at such intervals that the injected material sets and is removed from the mold cavity before the next injecting operation begins.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be apprehended within the meaning and range of equivalence of the following claims.

What is claimed as new and desired to be secured by Letters Patent is:

1. An injection molding apparatus comprising, in combination, support means; at least one mold mounted on said support means and having an inlet passage; and injection means including moving means having a stationary member fixedly carried by said support means and a movable member guided by said stationary member for movement toward and away from said mold, a piston carried by said movable member for movement therewith toward and away from said mold, a cylinder surrounding said piston and carried thereby movable therewith in axial direction between an advanced position and a retracted position, said cylinder defining between one end thereof facing said mold and one side of said piston a variable volume chamber and said piston being movable relative to said cylinder so that the volume of said chamber decreases when said piston moves relative to said cylinder toward said one end thereof and increases when said piston moves toward the other end of said cylinder, stop means engaging said other end of said cylinder at the retracted position thereof, nozzle means carried by said one end of said cylinder formed with a bore therethrough communicating with said chamber and having an outlet end axially aligned with said inlet passage of said mold, said nozzle means engaging said mold when said cylinder is in said advanced position so that said outlet end communicates with said inlet passage, a source of plastic material, passage means providing communication between said source of plastic material and a portion of said bore, first one-way valve means in said passage means permitting flow of plastic material from said source through said passage means so that plastic material will be sucked into said chamber when said piston moves toward said other end of said cylinder while flow in opposite direction through said passage means is prevented during movement of said piston in opposite direction, and second one-way valve means in said bore downstream of said portion movable between a closed position and an open position for permitting in the latter flow of plastic material from said chamber to said outlet end of said bore and including adjustable resilient means tending to keep said second one-way valve means in said closed position until pressure on the plastic material in said chamber reaches a predetermined pressure, whereby during movement of said movable member away from said mold said piston and said cylinder will first move together to the retracted position of the latter until said cylinder engages said stop means after which said piston will move relative to said cylinder toward the other end thereof so that plastic material is sucked into said chamber while during movement of said movable member toward said mold said piston will move with said cylinder to said advanced position of the latter while outflow of plastic material from said chamber through said bore is prevented by said second one-way valve means kept in closed position by said adjustable resilient means thereof until said nozzle means engages said mold preventing thereby further movement of said cylinder together with said piston so that the latter moves relative thereto toward said one end thereof increasing thereby the pressure on the plastic material beyond said prdetermined pressure and moving said second one-way valve means to the open position thereof so that plastic material will be injected from said chamber into said mold.

2. An injection molding apparatus as set forth in claim 1 in which said stationary member of said moving means is formed by a cylinder member and said movable member by a piston member reciprocable in said cylinder member and including a piston rod fixed to said piston member and carrying said piston.

3. An injection molding apparatus as set forth in claim 2 in which said piston is removably connected to said piston rod.

4. An injection molding apparatus as set forth in claim 2 in which said stop means is at least in part formed by one end of said cylinder member.

5. An injection molding apparatus as set forth in claim 4 and including resilient means arranged between said one end of said cylinder member and said other end of said cylinder.

6. An injection molding apparatus as set forth in claim 1 and including means for adjusting the vertical position of said stationary member for aligning said outlet end of said nozzle means with said inlet passage of said mold.

7. An injection molding apparatus as set forth in claim 1 and including yieldable gate means in said inlet passage of said mold movable between an open and a closed position; and needle means fixed to said nozzle means and cooperating with said gate means for moving the same to said open position when said nozzle means engages said mold.

8. An injection molding apparatus as set forth in claim 1 in which said first one-way valve means includes adjustable resilient means tending to keep said first one-way valve means in closed position until a partial vacuum of predetermined magnitude is created downstream of said first one-way valve means during movement of said piston relative to said cylinder toward the other end of the latter.

References Cited in the file of this patent

UNITED STATES PATENTS

| | | |
|---|---|---|
| 2,422,990 | Spanier | June 24, 1947 |
| 2,430,033 | Stacy et al. | Nov. 4, 1947 |
| 2,443,554 | DeMattia | June 15, 1948 |
| 2,456,423 | Jobst | Dec. 14, 1948 |
| 2,461,723 | Cowan | Feb. 15, 1949 |
| 2,585,204 | Wondra | Feb. 12, 1952 |
| 2,992,455 | Salzman | July 18, 1961 |
| 2,997,742 | Mieville | Aug. 29, 1961 |
| 2,994,920 | Patera | Aug. 8, 1961 |
| 3,012,280 | Scott et al. | Dec. 12, 1961 |

FOREIGN PATENTS

| | | |
|---|---|---|
| 802,843 | Germany | Feb. 26, 1951 |
| 1,172,986 | France | Oct. 20, 1958 |